(12) United States Patent
Schmidt et al.

(10) Patent No.: US 9,301,367 B2
(45) Date of Patent: Mar. 29, 2016

(54) LUMINOUS ELEMENTS WITH AN ELECTROLUMINESCENT ARRANGEMENT AND METHOD FOR PRODUCING A LUMINOUS ELEMENT

(71) Applicant: InovisCoat GmbH, Monheim am Rhein (DE)

(72) Inventors: Rudolf Schmidt, Cologne (DE); Arno Schmuck, Leichlingen (DE)

(73) Assignee: InovisCoat GmbH, Monheim am Rhein (DE)

( * ) Notice: Subject to any disclaimer, the term of this patent is extended or adjusted under 35 U.S.C. 154(b) by 0 days.

(21) Appl. No.: 14/362,236

(22) PCT Filed: Dec. 18, 2012

(86) PCT No.: PCT/DE2012/001208
§ 371 (c)(1),
(2) Date: Jun. 2, 2014

(87) PCT Pub. No.: WO2013/091604
PCT Pub. Date: Jun. 27, 2013

(65) Prior Publication Data
US 2014/0354140 A1 Dec. 4, 2014

(30) Foreign Application Priority Data

Dec. 19, 2011 (DE) .......................... 10 2011 121 358
Mar. 20, 2012 (DE) .......................... 10 2012 005 449
Aug. 27, 2012 (DE) .......................... 10 2012 016 759

(51) Int. Cl.
*H05B 33/14* (2006.01)
*H05B 33/10* (2006.01)
*C09K 11/56* (2006.01)
*H05B 33/20* (2006.01)
*H05B 33/06* (2006.01)

(52) U.S. Cl.
CPC .............. *H05B 33/14* (2013.01); *C09K 11/565* (2013.01); *H05B 33/06* (2013.01); *H05B 33/10* (2013.01); *H05B 33/20* (2013.01)

(58) Field of Classification Search
CPC .......... H05B 33/00–33/06; H05B 33/10–33/28
USPC .................................................. 313/498–512
See application file for complete search history.

(56) References Cited

U.S. PATENT DOCUMENTS

| | | | |
|---|---|---|---|
| 3,579,056 A | | 5/1971 | TeVelde et al. |
| 4,458,177 A | * | 7/1984 | Hunter et al. ................. 313/503 |
| 4,684,353 A | * | 8/1987 | deSouza ....................... 313/511 |
| 4,769,292 A | | 9/1988 | Tang et al. |

(Continued)

FOREIGN PATENT DOCUMENTS

| | | |
|---|---|---|
| DE | 18 03 138 A1 | 6/1969 |
| DE | 2 314 890 A1 | 10/1973 |

(Continued)

OTHER PUBLICATIONS

Research Disclosure 38957, Sep. 1996, pp. 591-639.

(Continued)

*Primary Examiner* — Mariceli Santiago
(74) *Attorney, Agent, or Firm* — Collard & Roe, P.C.

(57) ABSTRACT

The invention relates to a luminous element having a luminous layer which comprises electroluminescent particles and a water-dispersible or water-soluble protective colloid.

14 Claims, 1 Drawing Sheet

(56) References Cited

U.S. PATENT DOCUMENTS

| | | | |
|---|---|---|---|
| 5,126,214 A | 6/1992 | Tokailin et al. | |
| 5,352,951 A * | 10/1994 | Kardon et al. | 313/502 |
| 5,725,651 A | 3/1998 | Zambounis et al. | |
| 5,856,029 A * | 1/1999 | Burrows | 313/503 |
| 5,856,031 A | 1/1999 | Burrows | |
| 5,980,976 A | 11/1999 | Burrows | |
| 6,261,633 B1 | 7/2001 | Burrows | |
| 6,517,226 B1 | 2/2003 | Zimmermann et al. | |
| 6,551,726 B1 | 4/2003 | Burrows | |
| 6,811,895 B2 | 11/2004 | Murasko et al. | |
| 6,835,470 B1 | 12/2004 | Magain et al. | |
| 6,870,313 B2 | 3/2005 | Tramontana | |
| 6,916,553 B2 | 7/2005 | Willaert et al. | |
| 7,172,822 B2 | 2/2007 | Shibata | |
| 7,176,617 B2 | 2/2007 | Endo et al. | |
| 7,189,771 B2 | 3/2007 | Hsu | |
| 7,247,342 B2 | 7/2007 | Willaert et al. | |
| 7,279,831 B2 | 10/2007 | McDonough et al. | |
| 7,317,047 B2 | 1/2008 | Hsu | |
| 7,741,773 B2 | 6/2010 | Mahmood et al. | |
| 7,745,018 B2 | 6/2010 | Murasko et al. | |
| 7,824,936 B2 | 11/2010 | Park et al. | |
| 8,338,512 B2 | 12/2012 | Hsu | |
| 8,455,865 B2 | 6/2013 | Hsu | |
| 8,470,388 B1 | 6/2013 | Zsinko et al. | |
| 8,686,638 B2 | 4/2014 | Marwede et al. | |
| 8,772,818 B2 | 7/2014 | Klein et al. | |
| 8,952,610 B2 | 2/2015 | Rabe et al. | |
| 2003/0022018 A1 | 1/2003 | Baumberg et al. | |
| 2003/0107313 A1 * | 6/2003 | Andriessen | 313/506 |
| 2003/0232005 A1 * | 12/2003 | Okada et al. | 423/659 |
| 2004/0040594 A1 * | 3/2004 | Andriessen | 257/40 |
| 2004/0075383 A1 | 4/2004 | Endo et al. | |
| 2004/0081851 A1 | 4/2004 | Eiden et al. | |
| 2004/0124504 A1 | 7/2004 | Hsu | |
| 2004/0164674 A1 | 8/2004 | Ottermann et al. | |
| 2005/0001538 A1 | 1/2005 | Ozkan et al. | |
| 2005/0058770 A1 | 3/2005 | Kiguchi et al. | |
| 2005/0095457 A1 | 5/2005 | Grushin et al. | |
| 2005/0248268 A1 | 11/2005 | Hardinger et al. | |
| 2007/0199999 A1 | 8/2007 | Bailleu et al. | |
| 2007/0298203 A1 | 12/2007 | McDonough et al. | |
| 2008/0111108 A1 | 5/2008 | Goan | |
| 2009/0102365 A1 | 4/2009 | Takemoto et al. | |
| 2009/0184637 A1 | 7/2009 | Yukinobu et al. | |
| 2010/0195337 A1 | 8/2010 | Heite et al. | |
| 2010/0209724 A1 | 8/2010 | Hartmann et al. | |
| 2011/0052926 A1 | 3/2011 | Nakamura et al. | |
| 2011/0168429 A1 | 7/2011 | McDonough et al. | |
| 2014/0077201 A1 | 3/2014 | Becker et al. | |
| 2014/0308436 A1 | 10/2014 | Nakamura et al. | |
| 2014/0374726 A1 | 12/2014 | Goeoetz et al. | |

FOREIGN PATENT DOCUMENTS

| | | |
|---|---|---|
| DE | 2 238 943 A1 | 2/1974 |
| DE | 22 60 205 B2 | 6/1974 |
| DE | 3 872 732 T2 | 3/1993 |
| DE | 690 25 348 T2 | 6/1996 |
| DE | 297 19 043 U1 | 12/1997 |
| DE | 198 32 690 A1 | 12/1998 |
| DE | 695 05 552 T2 | 4/1999 |
| DE | 200 18 732 U1 | 1/2001 |
| DE | 20313630 U1 | 12/2003 |
| DE | 600 04 103 T2 | 4/2004 |
| DE | 103 08 515 A1 | 9/2004 |
| DE | 103 23 306 A1 | 12/2004 |
| DE | 698 21 554 T2 | 12/2004 |
| DE | 103 51 556 A1 | 6/2005 |
| DE | 10353992 A1 | 6/2005 |
| DE | 20 2006 001 945 U1 | 4/2006 |
| DE | 600 22 656 T2 | 6/2006 |
| DE | 10 2005 025 224 B3 | 10/2006 |
| DE | 602 10 178 T2 | 1/2007 |
| DE | 601 21 950 T2 | 3/2007 |
| DE | 10 2006 009 030 B3 | 6/2007 |
| DE | 10 2006 015 449 A1 | 10/2007 |
| DE | 10 2006 037930 A1 | 2/2008 |
| DE | 10 2006 049 399 A1 | 4/2008 |
| DE | 10 2008 004 942 A1 | 6/2009 |
| DE | 10 2008 001 526 A1 | 11/2009 |
| DE | 10 2011 076 750 A1 | 12/2012 |
| DE | 10 2011 079 101 A1 | 1/2013 |
| DE | 10 2012 200 485 A1 | 7/2013 |
| DE | 20 2013 011 255 U1 | 1/2014 |
| DE | 10 2012 024 163 A1 | 6/2014 |
| EP | 0 818 793 A1 | 1/1998 |
| EP | 0823831 B1 | 2/1998 |
| EP | 1026923 B1 | 8/2000 |
| EP | 0 906 714 B1 | 7/2004 |
| EP | 1 991 031 A1 | 11/2008 |
| EP | 1 702 372 B1 | 9/2010 |
| EP | 2 549 837 A1 | 1/2013 |
| GB | 815 720 A | 7/1959 |
| GB | 1 158 924 A | 7/1969 |
| GB | 2 507 223 A | 4/2014 |
| JP | 2005-264108 A | 9/2005 |
| JP | 2007-224135 A | 9/2007 |
| RU | 2124281 C1 | 12/1998 |
| WO | 2004/108426 A2 | 12/2004 |
| WO | 2007/032179 A1 | 3/2007 |
| WO | 2009/008576 A1 | 1/2009 |
| WO | 2009/030701 A1 | 3/2009 |
| WO | 2010/082428 A1 | 7/2010 |
| WO | 2011/076326 A1 | 6/2011 |

OTHER PUBLICATIONS

International Search Report of PCT/DE2012/001208, mailed Apr. 26, 2013.

* cited by examiner

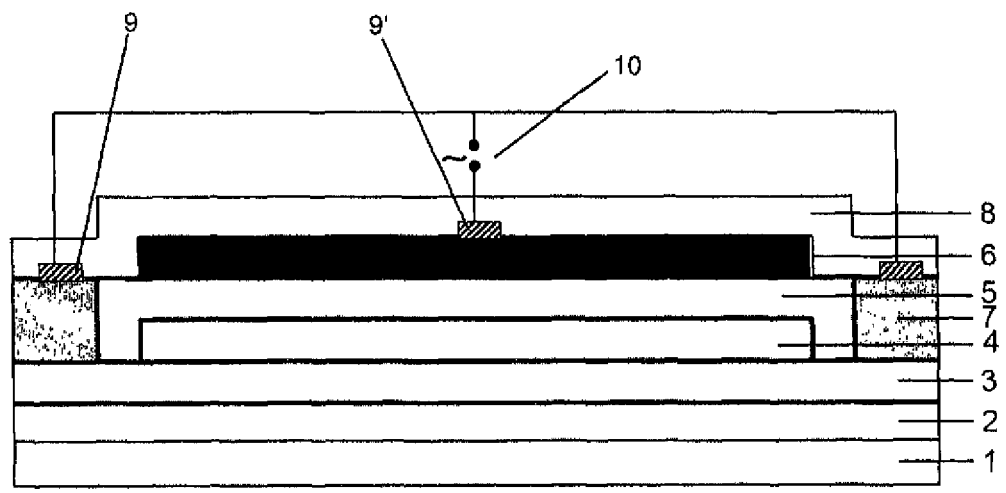

LUMINOUS ELEMENTS WITH AN ELECTROLUMINESCENT ARRANGEMENT AND METHOD FOR PRODUCING A LUMINOUS ELEMENT

CROSS REFERENCE TO RELATED APPLICATIONS

This application is the National Stage of PCT/DE2012/001208 filed on Dec. 18, 2012, which claims priority under 35 U.S.C. §119 of German Application Nos. 10 2011 121 358.2 filed on Dec. 19, 2011, 10 2012 005 449.1 filed on Mar. 20, 2012, and 10 2012 016 759.8 filed on Aug. 27, 2012, the disclosures of which are incorporated by reference. The international application under PCT article 21(2) was not published in English.

The invention relates to a luminous element having an electroluminescent arrangement comprising a luminous layer that has inorganic electroluminescent particles. Such luminous elements are known, for example, from WO 2009/030 701 A1, "Electroluminescent arrangement on textile materials."

From US 2008/0111108 A1, it is known, in the context of plasma cells, to use a protective colloid in the production of phosphorus particles. Because temperatures between 1000° C. and 1400° C. are used during production, it must be precluded that the protective colloid remains on the phosphors. Therefore no protective colloid in a luminous layer is disclosed. Furthermore, the plasma material is a completely different system from that of the luminous element having a luminescent arrangement according to the invention.

US 2009/0102363 A1 describes the production of very small organic luminous particles by means of micro-fragmentation of a layer that contains molecular luminous pigments, and the application of a formulation produced with them, using a printing method. The durability of materials that are based on organic luminous particles is unsatisfactory. Furthermore, the production method comprises expensive steps such as electrolithography and vapor deposition.

Electroluminescence (also called the Destriau effect), is a phenomenon in which an inorganic substance which is capable to emit light, usually doped zinc sulfide, is excited to produce light (visible electromagnetic radiation) between the plates of a capacitor, by means of applying a high-frequency alternating voltage (50 Hz-3000 Hz).

In the case of the known luminous layers, the substances that contain solvents and the required dispersion stability make the production process more difficult.

It is therefore the task of the invention to make available an environmentally friendly luminous element that can be produced in cost-advantageous manner and, at the same time, demonstrates particularly good durability.

This task is accomplished with a luminous element of the stated type, in which the luminous layer exhibits a water-dispersible or water-soluble protective colloid.

The luminous element can comprise at least one support and at least one electroluminescent arrangement disposed on the latter, whereby the electroluminescent arrangement exhibits at least a front electrode, a luminous layer, an insulating layer, and a rear electrode. The luminous layer and insulating layer can also be applied in one step or in one layer.

In a preferred embodiment of the invention, the luminous element has the following layers on a support:
  optionally but preferably an adhesive layer that improves the adhesion of the overlying layers with the substrate,
  a transparent and electrically conductive layer as a front electrode,
  a layer that contains a luminous substance that can be excited by means of an electrical alternating voltage field as the luminous layer,
  an insulating layer with high dielectricity,
  a layer with high conductivity as the rear electrode,
  optionally but preferably conducting paths as a connector for the front electrode,
  optionally but preferably a barrier layer, and
  contacts as well as connectors for an alternating voltage source.

The electroluminescent arrangement can also be applied to the support in the reverse sequence, instead of as described above.

The entire arrangement of all the layers applied to the support will also be referred to as a layer arrangement hereinafter. The layer arrangement therefore comprises the electroluminescent arrangement and thereby also the luminous layer(s).

Both the support and, in particular, also one or more of the layers of the layer package as described above can be structured in one-ply or multi-ply or multi-layer manner. In this connection, the individual plies or layers having the same function can differ in terms of their composition.

It has been found that in the case of a luminous element, one or more of the layers of the layer package situated on the support, particularly one or more luminous layers, can exhibit at least one water-dispersible or water-soluble protective colloid, and that as a result, such luminous elements can be produced in particularly simple manner.

When drying such a layer package that contains a protective colloid and water, or such a luminous layer, a strong shrinkage may occur, which can destroy the whole layer arrangement. It is therefore proposed that one or more layers of the layer package, particularly one or more luminous layers, contain one or more plasticizer(s).

In a preferred embodiment, at least one plasticizer should be contained in at least one layer of the layer package, preferably in a luminous layer, in an amount that prevents undesirable fragility, brittleness, and deformation of the luminous element on drying. The individual components should therefore be coordinated with one another in such a manner that the luminous element does not break even at a bending radius of 1 cm, preferably of 0.5 cm, and particularly preferably of 0.3 cm. This applies for tensile stress (layer side on the outside) and also for pressure stress (layer side on the inside). Bending radii are determined, within the scope of the invention, by means of a 180° loop (half) around rolls having a defined radius (corresponds to the bending radius).

In an advantageous embodiment, the layer package contains a total of 0.6 g plasticizer per $m^2$ to 2.0 g plasticizer per $m^2$, preferably 0.8 g plasticizer per $m^2$ to 1.2 g plasticizer per $m^2$.

In order to achieve great dispersion stability of the formulation used for the coating method, in each instance, during the production of the luminous element it is proposed that the resulting layer package and, in particular, those layers within that contain dispersed or suspended particles, such as the luminous layer, for example, exhibit a protective colloid, preferably in an amount of at least 10 percent by weight (wt.-%), particularly of 10 wt.-% to 40 wt.-%, based on the weight after drying. Furthermore, it is advantageous if the layer package contains maximally 0.1 wt.-% water with reference to its weight after drying. A high dispersion stability is important for all preparations that contain pigments and are used for the production of the layers of the layer arrangement of the invention, and particularly important for the layers that contain luminous pigments. The pigments are kept in suspension in the aqueous dispersion during the coating process, using the protective colloid.

It is particularly advantageous if the layer package contains residuals of maximally 0.05 wt.-% organic solvents, with the exception of ethanol, isopropanol or butanols, with reference to the dry weight, wherein ethanol, isopropanol and butanols may be present in higher amounts.

Different materials can be used as protective colloids. Protective colloids or flocculation protection agents are usually polymer systems that are supposed to prevent agglomeration, coagulation or flocculation of an emulsified, suspended or dispersed component. An essential property of protective colloids is that they bind large amounts of water during solvation. Thus, high viscosities can be achieved in aqueous solutions, depending on the concentration. In contrast to emulsifiers, protective colloids generally do not lower the surface tension between an embedded polymer particle and the surrounding water. Protective colloids do not form micelles, and are used for stabilization of dispersions.

Not only natural substances such as gelatins, starch, chitosan, casein, and dextrin, but also derivatives of natural substances, such as cellulose derivatives, for example hydroxypropyl methylcellulose (HPMC) or carboxymethyl cellulose (CMC) or modified or partially decomposed gelatins are used as protective colloids. However, polymers such as polyvinyl alcohols, polyvinyl pyrrolidones, polyacrylic acids, and polyacrylamides can also be used as protective colloids, as can wax emulsions, for example a non-ionic ethylene/vinyl acetate copolymer wax. Gelatin is particularly preferred as a protective colloid; aside from its viscosity, it also has a good insulator effect.

Particularly if protective colloids made from natural substances are used, the use of biocides is recommended in order to improve the shelf life of coating solutions. Preferably, biocides from the group of benzisothiazolones are used, for example Proxel (1,2-benzisothiazol-3(2H)-one). The biocides are preferably applied in amounts of 0.003 $g/m^2$ to 0.03 $g/m^2$, particularly of 0.005 $g/m^2$ to 0.01 $g/m^2$.

Further components, some of them optional, comprised by a luminous element according to the invention will be described in more detail below.

A support of the invention should preferably be flexible and, in particular, allow a bending radius (see above) that is desired for the luminous element, depending on its intended use. Furthermore, it is advantageous to select it from among known support materials, considering the aspect that it is well suited for the method for application of the layer package, including the electroluminescent arrangement.

Clear, transparent, and flexible films can serve as support materials, like the following polymers or mixtures thereof: polyethylene, polyester, cellulose acetate, particularly cellulose triacetate, PET (polyethylene terephthalate), polycarbonate, PLA (polylactic acid), polyamide 6, polyamide 12, PEN (polyethylene naphthalate), PTFE (Teflon®=polytetrafluoroethylene), POM (polyoxymethylene), and ETFE (ethylene tetrafluoroethylene).

The support can also be a textile. Particularly when using textiles as supports, it is advantageous when the support has a primer layer, in order to adapt the absorption capacity and/or the surface composition for the following coating steps. Thus, for example, coating of surfaces that are uneven could lead to defects in the coating. The primer layer(s) can exhibit a thermoplastic polyurethane, for example, in order to make the surface of the support smoother. This layer can preferably be diluted with water.

The substrations and surface treatments of the support, which are known for coating methods, are suitable as adherent layer. Preferably, the adherent layer contains gelatin, particularly in an amount of 1.5 $g/m^2$ to 3.2 $g/m^2$, and particularly preferably of 1.8 $g/m^2$ to 2.8 $g/m^2$.

Furthermore, the adherent layer can contain other substances which improve the coatability and the stability, for example, such as biocides and plasticizers, as described above, wetting agents, and other coating additives, for example.

The luminous element can exhibit an alcohol-soluble, transparent, conductive front electrode. This front electrode layer comprises a conductive substance and should preferably have a dry layer thickness of less than 20 µm.

Preferably, the front electrode, in addition to its high conductivity, also demonstrates a high transparency, and does not overly absorb the light emitted in the overlying luminous layer.

A particular embodiment provides that PEDOT:PSS is used as a front electrode; this is offered for sale by the company Agfa-Gevaert N.V. under the trade name Orgacon, or by the company Hereaus under the trade name Clevios, for example. In order to guarantee a defect-free wetting of a substratum with the coating solution, it is advantageous when the surface tension is adjusted using suitable anionic, cationic or non-ionic wetting agents. The front electrode can be applied over the full area, and the dry film thickness is preferably from 2 µm to 15 µm.

Alternatively, the front electrode can also be part of the substrate. Conductive yarns or threads can be used in textiles, for example. As a result, the textile itself becomes the electrode.

A luminous layer of the invention preferably contains inorganic luminous pigments (electroluminescent particles) as the luminous substance, and is then also called a luminous pigment layer. These inorganic luminous pigments result in increased durability of the luminous element as compared with organic pigments. Such a luminous pigment layer preferably contains pigments in an aqueous dispersion during production and before drying. The luminous layer is preferably applied in the center, narrower, and at a distance of preferably 1 cm to 2 cm from the edge.

A preferred embodiment provides that the luminous layer has a dry thickness layer of less than 40 µm.

A luminous element of the invention preferably contains at least 10 wt.-%, particularly 10 wt.-% to 40 wt.-% of a protective colloid—with reference to the dry weight. This is particularly advantageous if a luminous pigment layer is involved.

Furthermore, it is advantageous if the luminous layer contains maximally 0.1 wt.-% water in relation to its dry weight.

The luminous pigments preferably have an average grain size of 0.5 µm to 50 µm, particularly of 20 µm to 40 µm. Advantageously, zinc sulfides that are doped with foreign atoms such as Cu, Mn, Ag, Au, Pb, P, As, Sb, Sn, V, Tl, Sc or mixtures of such foreign atoms are used as luminous pigments. In addition to the frequency of the applied alternating voltage, the doping determines the light color. Different color nuances or even a white color can be produced with a mixture of different pigments or by means of the application of multiple layers having different pigments, by means of additive light mixing.

In order to increase the shelf life of the luminous pigments, these are preferably encapsulated with $Al_2O_3$ or $SiO_2$. However, they can also be embedded in lipophilic organic binders.

An insulating layer serves as electrical insulation of the luminous layer from an electrode. This layer is also referred to as a dielectric. It preferably serves, at the same time, also as a reflective layer that reflects the generated light in the luminous layer in the direction of the observer.

It is advantageous if such an insulating layer contains a protective colloid in an amount of 0.5 to 1.5 $g/m^2$, preferably of 0.6 to 1.0 $g/m^2$, whereby gelatin is preferred as a protective colloid.

In an advantageous embodiment, the insulating layer includes at least one electrically insulating component (non-conductor), for example a polyurethane dispersion.

Aside from the insulating property, a high level of reflection of the insulating layer for the light emitted from the luminous layer is of great importance for the light yield of the electroluminescent arrangement. Because the rear electrode that lies above absorbs light to a great degree, the proportion of luminescent radiation emitted toward the rear electrode would otherwise be lost if it were not reflected in the direction of the observer.

For this reason, the insulating layer can optionally comprise further additives such as reflective pigments such as titanium oxide, for example.

The insulating layer is applied, as compared with the luminous pigment layer, preferably as slightly as possible on each side, but maximally 33 mm, preferably between 0.2 and 10 mm wider than the light-emitting layer that lies underneath it, in order to cover the entire surface of the luminous layer. The dielectric can be applied as a layer, but short-circuits are more reliably prevented in that multiple layers, particularly 2, 3, 4, 5, 6 or more than 6 layers of a dielectric are applied.

A particular embodiment provides that the insulating layer of the electroluminescent arrangement contains reflective substances, particularly titanium dioxide in a water-soluble binder matrix such as gelatin, for example, preferably along with polymer plasticizers. The total dry layer thickness of the insulating layer preferably amounts from 10 µm to 50 µm.

A rear electrode consists of an electrically conductive material and can be either transparent like the front electrode, for example, or opaque.

The electrically conductive material is preferably contained in the rear electrode layer in an amount of 2 to 20 $g/m^2$, particularly of 5 to 15 $g/m^2$, and particularly preferably of 7 to 12 $g/m^2$. Preferably, a strongly light-absorbing conductive material is used, such as carbon black, for example. Alternatively, a strongly light-absorbing material can be additionally contained in the layer.

The conductive rear electrode is preferably applied in the center and preferably covers the same area as the luminous pigment layer or overlaps the latter slightly, without touching the front electrode. In an advantageous embodiment, the rear electrode comprises at least one silver layer that contains fine silver particles which are dispersed in a conductive polymer matrix (for example polyaniline). The layer thickness of the rear electrode can amount to about 10 µm to 80 µm, for example.

The conductor paths improve the electrical supply and thereby the luminous effect, which becomes particularly noticeable as a uniform, large-area luminescence of the lamp superstructure or luminous element. This can be guaranteed by means of affixing a connector on the front electrode layer. The connector comprises such a conductor track, which is also referred to as a bus bar. For this purpose, a conductor track having a width of about 1 cm, for example, is applied to the front electrode, which should not come into contact with the rear electrode, because otherwise a short-circuit will destroy the function of the arrangement. Preferably, the same substance is used for the bus bar as for the rear electrode. In the case of a sufficiently great conductivity of the front electrode, the bus bar can also be eliminated.

Alternatively, a metal lattice, for example composed of silver, can also be used.

Preferably, a cover layer is used as a barrier layer; this layer protects the luminous element and, in particular, the luminous layer from oxygen in the air and moisture, and, if applicable, from chemicals and mechanical damage. The barrier should have an electrically insulating effect, in order to protect the user from injury caused by the electrical current. The barrier layer can be omitted at the connector parts for the front and rear electrode.

Actega Terraflex barrier varnish, for example, along with a polyethylene or polyvinylidene fluoride dispersion (PVDF) is suitable as a barrier layer. Alternatively, other commercially available barrier layers made of glass or film can also be used.

Contacting of the luminous element is made preferably with conductive materials, particularly metal sheets, which are glued onto the bus bar and/or the rear electrode with a conductive adhesive tape such as 3M™ Electrically Conductive Adhesive Transfer Tape (ECATT) 9723, for example.

Furthermore, the luminous element may also consist of the following layers or layer additives, for example:
one or more antistatic layers such as those described in Research Disclosure 38957, September 1996, p. 591 ff., TX-C, for example. The content of the entire document is hereby incorporated into the application by reference,
one or more auxiliary coating agents such as those described in Research Disclosure 38957, September 1996, p. 591 ff., IX-A, for example. The content of the entire document is hereby incorporated into the application by reference, and
one or more "non-curling" layers that can improve the planarity of the element.

In a preferred embodiment of the invention, one, multiple or all the layers have one or more hardening agents (cross-linking agents, crosslinkers) added to them, and thereby the layers are hardened after coating and drying, in order to achieve good water resistance. For this purpose, a cross-linking agent that is suitable for the given matrix, in each instance, is used. For layers containing gelatin, the compounds indicated in the Research Disclosure 38957, September 1996, p. 591 ff., II-B, for example, are suitable, particularly glyoxal, divinyl sulfone hardening agent or, for rapid hardening, an immediate hardening agent such as H-1 (see below), for example. For matrices with hydroxyl groups, such as polyvinyl alcohols, cellulose derivatives or polyethylene glycols, trifunctional isocyanates, for example, such as Desmodur N 3300, for example, are possible cross-linking agents.

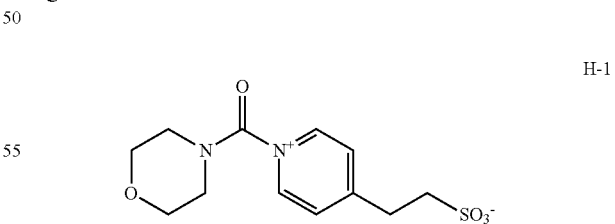

H-1

A particularly advantageous method for the production of such a luminous element of the invention includes the method step that at least one layer, i.e. one part of the layer package, and particularly one part of the luminous layer, are produced using a coating method. Preferably, the entire layer package, particularly the entire electroluminescent arrangement, and particularly preferably at least the entire luminous layer is applied to a support using a coating method, wherein the luminous layer is applied as single layer or in the form of multiple layers. All or individual ones of the layers mentioned can, however, also be applied to a support using another suitable method.

Suitable methods for the application of layers, particularly of luminous layers, onto a support are doctor blade coating, immersion coating, spray coating or roll coating, also with a reversed roll coater, or, in a preferred embodiment, a single or multilayer coating by means of a cascade or curtain coating method.

For this purpose, the individual layer components are emulsified or dispersed, if necessary, and converted to a preparation that can be used for coating solutions that contain water. This means that a water-based composition is used for at least one layer. Preferably, only demineralized sterilized water is used. The concentrations of the solutions depend on the selected application method and vary as a function of the applied wet thickness. The coating solutions are applied using an application method that corresponds to the state of the art.

In an advantageous embodiment of the invention, only so few highly volatile organic solvents are used in such a small amount for the production of the luminous element that production can take place without explosion-protected apparatuses.

This is achieved in that water-based compositions are used for the preparations used for the production of the individual layers of the luminous element, as far as possible. Preferably, water-based compositions are used for all the layers of the luminous element. A water-based composition should be understood to be a composition that contains dissolved or dispersed substances, and the volatile ingredients of which, which are removed after production of the luminous element, by means of drying, for the most part, consist of water by at least 50 wt.-%, preferably by at least 80 wt.-%, and particularly preferably by at least 95 wt.-%.

To achieve a sufficient dispersion stability for the given aqueous dispersion, it is proposed that the dispersion, after addition of the water-dispersible or water-soluble protective colloid, has a viscosity of less than 400 mPa·s (preferably 120-200 mPa·s). The viscosity of the dispersion is preferably measured using a rotation viscosimeter (for example Brookfield viscosimeter DVII), at a temperature of 40° C.

The invention therefore also covers luminous elements that are produced using water-based preparations.

Preferably, a coating equipment is used for the production of the luminous element that can be adapted to the required width.

The luminous element is preferably produced in such a manner that it can be cut using tools such as scissors or cutting rolls, without impairing its function.

In another embodiment of the invention, at least one layer, preferably more than one layer, and particularly preferably all the layers are applied using water-based inks, using a printing method, particularly an ink-jet printing method.

Such luminous elements are suitable, for example, as tent or vehicle tarps, and can also be used as an interior liner of a vehicle or for other lighting purposes.

EXAMPLES

Example 1

Production of the Casting Solution for a Luminous Layer

An exemplary formula for the production of a solution for coating a luminous layer consists of the following substances:

4.16 $g/m^2$ photo gelatin,
19.02 $g/m^2$ distilled water, and
11.83 $g/m^2$ luminous pigment GTP GG44.

The photo gelatin is stirred in distilled water at 20° C. The mixture must swell for 1 hour.

The gelatin/water mixture is slowly digested at 45° C., until the gelatin has melted completely.

The luminous pigment is added 20 minutes (min.) before coating the aqueous gelatin solution, and the dispersion is digested for 15 min. This is followed by ultrasound degasification for 5 min.

The dispersion is applied to the substrated support, using a wet thickness of 25 μm, by means of doctor blade coating, roll coating or cascade coating. The drying time is approx. 30 min. at 40° C.

This luminous layer is only a part of a luminous element, which usually consists of an adhesive layer, a front electrode layer, a luminous layer, a dielectric, and a rear electrode layer.

Example 2

Luminous Element

A particularly preferred water-based luminous element is produced in that the layers described below, one after the other (layer package 1) are applied to a polyester base (manufacturer: Agfa Gevaert N.V., thickness: 125 μm, trade name Astera 125, substrated on one side).

The components used (see the following table) are commercially available.

| Product | Active substance (active substance class) | Manufacturer/Source of supply |
|---|---|---|
| Imagel AP | Gelatin (protective colloid) | Gelita |
| Proxel U5 | 1,2-benzisothiazol-3(2H)-one (biocide) | Arch Chemicals, Inc. |
| Polymer dispersion, copolymer of polyethylene and polyacrylate | Polyethylene acrylate (plasticizer) | Agfa Labs |
| Metaupon OMT | Sodium-2-[methyloleoyl-amino]ethane-1-sulfonate (wetting agent) | Leuna-Tenside GmbH |
| TERGITOL ® | Nonyl phenol polyethylene glycol ether (wetting agent) | Union Carbide |
| Clevios SV4 | PEDOT:PSS (conductive substance) | Heraeus |
| Luminous pigment GG44 | Zinc sulfide (luminous substance) | GT&P |
| CMC carboxymethyl cellulose | Carboxymethyl cellulose (protective colloid) | Alfa Aesar |
| Dynasylan F8815 | Fluoroalkyl silane (adhesion-imparting agent) | Evonik |
| Tubicoat MEA | Polyurethane dispersion (non-conductive substance) | CHT R. Breitlich GmbH |
| Titanium dioxide dispersion | $TiO_2$ (reflective substance) | Kronos Titan GmbH |
| Carbon black | Carbon (conductive substance) | Evonik Carbon Black GmbH |
| Aquatix 8421 | Ethylene vinyl acetate copolymer | BYK-Chemie GmbH |

| Product | Active substance (active substance class) | Manufacturer/Source of supply |
|---------|-------------------------------------------|-------------------------------|
|         | wax (protective colloid)                  |                               |

The layers are applied in one pass with a cascade coater (multilayer coating). The concentrations required for good coating rheology, the amounts of water per coating solution, and the viscosity of the latter are determined and taken into consideration in accordance with known methods.

The applications of the layer components listed below are given in $g/m^2$. The values in the curly brackets indicate a practical amount range, and the values in the square brackets refer to amount ranges for a particularly preferred exemplary embodiment with high luminance and good durability. Thus, 1.5 $g/m^2$ to 3.2 $g/m^2$ gelatin are preferably used in the adhesive layer, particularly preferably 1.8 $g/m^2$ to 2.8 $g/m^2$.

The amounts stated, in each instance, are not restricted to the exemplary embodiment, but rather apply in general for corresponding layers of the invention or the additives contained in them. Thus, for example, the information explained for the adhesive layer, for the amount of gelatin preferably contained in it, also applies, within the context of the invention, as a preferred amount range for gelatin in any desired adhesive layer, independent of the other ingredients and independent of the structure of the luminous element, in each instance. Furthermore, the information applies not just for the concrete preferred additive (active substance) in the layer, but rather also for other suitable representatives of the active substance class, in each instance. The amount information for gelatin in the adhesive layer, for example, therefore applies also to other suitable protective colloids. This applies analogously for all the active substances listed in the above table and for the active substance class indicated in parentheses, in each instance.

The value in front of the brackets represents the amount of active substance used in the concrete exemplary embodiment.

| Layer Package 1 | |
|---|---|
| Layer 1 (adhesive layer) | |
| Gelatin | 2.38{1.5[1.8-2.8]3.2} |
| 1,2-benzisothiazol-3(2H)-one | 0.007{0.003[0.005-0.008]0.015} |
| Polyethylene acrylate | 0.24{0.15[0.18-0.28]0.32} |
| Sodium-2-[methyloleoyl amino]ethane-1-sulfonate | 0.095{0.095[0.72-0.11]0.13} |
| Nonyl phenol polyethylene glycol ether | 0.060{0.05[0.05-0.2]0.3} |
| Layer 2 (front electrode) | |
| Clevios SV4 | 20.5{18.0[19.0-28.0]36.0} |
| Nonyl phenol polyethylene glycol ether | 0.14 {0.10[0.12-0.18]0.20} |
| Layer 3 (luminous layer) | |
| Gelatin | 1.80{1.0[1.2-3.2]3.4} |
| Luminous pigment GG44 | 18.0{10.0[16.0-24.0]28.0} |
| Carboxymethyl cellulose | 0.18{0.10[0.12-0.32]0.34} |
| Polyethylene acrylate | 0.480{0.27[0.32-0.85]0.90} |
| Sodium-2-[methyloleoyl amino]ethane-1-sulfonate | 0.192{0.11[0.13-0.33]0.35} |
| Dynasylan F8815 | 0.240{0.01[0.02-0.25]0.26} |
| Layer 4 (dielectric) | |
| Tubicoat MEA | 27.4{20.0[25.0-35.0]75.0} |
| Titanium dioxide | 9.14{0.50[0.60-10.0]30.0} |
| Gelatin | 0.640{0.60[0.60-0.80]1.5} |
| Layer 5 (rear electrode) | |
| Proxel U5 | 0.040{0.01[0.02-0.08]0.16} |
| Gelatin | 8.58{4.0[5.0-9.0]9.2} |
| Carbon black | 7.42{7.0[7.2-10.0]14.0} |
| Nonyl phenol polyethylene glycol ether | 0.044{0.04[0.042-0.08]0.10} |
| Aquatix 8421 | 22.2{15.0[17.0-23.0]25.0} |

In comparison with luminous elements that are produced according to the state of the art, the luminous element described above yields a high luminance and a long useful lifetime. It allows small bending radii of approx. 3 mm (both tension and pressure) by means of the great flexibility of the layers. No organic solvents are used during production, the use of heavy metals is not necessary, and the production costs are low. There are no expenditures for explosion protection. Production scrap that occurs does not need to be disposed of as hazardous waste.

The FIGURE shows an exemplary embodiment with an advantageous layer structure.

An adhesive layer 2 is applied to a support 1. A transparent and electrically conductive layer lies on top of this as a front electrode 3. In the central region, a luminous layer 4 lies on the front electrode 3, above which layer there is an insulating layer 5 that reaches all the way to the front electrode 3 in the edge region. The rear electrode 6 lies above the luminous layer 4; this electrode also lies in the central region. Conductor tracks 7 disposed at the edges, outside of the central region, serve as connectors for the front electrode 3. A barrier layer 8 is applied over the entire width and above the rear electrode. Contacts 9 on the conductor track 7 and 9' on the rear electrode 6 serve as a connection to an alternating voltage source 10.

The invention claimed is:

1. Luminous element having an electroluminescent arrangement comprising a luminous layer that has inorganic electroluminescent particles, wherein the luminous layer exhibits a water-soluble protective colloid, and wherein the water-soluble protective colloid exhibits gelatin.

2. Luminous element according to claim 1, wherein the luminous layer exhibits at least one plasticizer.

3. Luminous element according to claim 1, wherein the electroluminescent particles exhibit doped zinc sulfide.

4. Luminous element according to claim 1, wherein it does not break at a bending radius of 0.5 cm.

5. Luminous element according to claim 1, wherein the luminous layer has at least 10 wt.-% protective colloid, with reference to its dry weight.

6. Luminous element according to claim 1, wherein the luminous element contains residuals of maximally 0.005 wt.-% organic solvent, with the exception of ethanol, isopropanol or butanols, with reference to the dry weight, wherein ethanol, isopropanol and butanols may be present in higher amounts.

7. Luminous element according to claim 1, wherein the luminous layer is disposed on a support.

8. Luminous element according to claim 1, wherein the luminous layer has a thickness of less than 40 μm.

9. Luminous element according to claim 1, wherein it exhibits an alcohol-soluble, transparent, conductive front electrode layer.

10. Luminous element according to claim 9, wherein the front electrode layer has a thickness of less than 20 μm.

11. Method for the production of a luminous element having an electroluminescent arrangement comprising a luminous layer that has inorganic electroluminescent particles, wherein the luminous layer exhibits a water-soluble protective colloid, wherein the water-soluble protective colloid is selected from the group consisting of natural substances, derivatives of natural substances, polyvinyl pyrrolidones, polyacrylic acids, and wax emulsions, and wherein all of the layers are produced using a coating method, with the use of water-based compositions.

12. Method according to claim 11, wherein the composition is a dispersion that exhibits a water-dispersible or water-soluble protective colloid and has a viscosity of less than 400 mPa·s.

13. Method according to claim 11, wherein the water-based composition contains volatile ingredients removed after production of the luminous element via drying for the most part, and wherein the volatile ingredients are composed of at least 50 wt. % of water.

14. Luminous element having an electroluminescent arrangement comprising a luminous layer that has inorganic electroluminescent particles, wherein the luminous layer exhibits a water-soluble protective colloid, wherein the water-soluble protective colloid is selected from the group consisting of natural substances, derivatives of natural substances, polyvinyl pyrrolidones, polyacrylic acids, and wax emulsions, and wherein the luminous layer contains maximally 0.1 wt.-% water, with reference to its dry weight.

* * * * *